United States Patent [19]

Odijk et al.

[11] Patent Number: 5,410,359
[45] Date of Patent: Apr. 25, 1995

[54] TELETEXT DECODER AND TELEVISION RECEIVER PROVIDED WITH A TELETEXT DECODER

[75] Inventors: Eddy A. M. Odijk; Rogatus H. H. Wester, both of Eindhoven; Johannis M. Jansen, Franeker; Henricus A. W. Van Gestel, Eindhoven, all of Netherlands

[73] Assignee: U.S. Philips Corporation, New York, N.Y.

[21] Appl. No.: 49,910

[22] Filed: Apr. 20, 1993

[30] Foreign Application Priority Data

Apr. 21, 1992 [EP] European Pat. Off. ............ 92201118
Jul. 22, 1992 [EP] European Pat. Off. ............ 92202256

[51] Int. Cl.⁶ .............................................. H04N 7/08
[52] U.S. Cl. ......................................... 348/468; 348/466
[58] Field of Search ................... 358/146, 147, 142; H04N 7/08; 348/563, 465, 468, 476, 473, 466

[56] References Cited

U.S. PATENT DOCUMENTS

| | | | |
|---|---|---|---|
| 4,719,510 | 1/1988 | Kinghorn | 358/142 |
| 4,908,707 | 3/1990 | Kinghorn | 358/142 |
| 4,953,022 | 8/1990 | Bugg | 358/142 |
| 4,992,871 | 2/1991 | Bensch et al. | 358/142 |

Primary Examiner—James J. Groody
Assistant Examiner—Jeffrey S. Murrell
Attorney, Agent, or Firm—David Schreiber

[57] ABSTRACT

A television receiver includes a teletext decoder which is adapted to check whether a keyword entered by the user occurs in a teletext cycle. The teletext pages with the searched keyword, or their page numbers, are identified and stored for later display or selection. The receiver has arrow keys for selecting the keyword on the display screen so that an alphabetical keyboard is not necessary. The receiver also includes a non-volatile memory in which a personal index of keywords can be programmed.

18 Claims, 6 Drawing Sheets

TELETEXT DECODER AND TELEVISION RECEIVER PROVIDED WITH A TELETEXT DECODER

FIELD OF THE INVENTION

The invention relates to a teletext decoder for receiving and displaying teletext pages. The invention also relates to a television signal receiver provided with a teletext decoder. Such a receiver may be, for example a television apparatus or a video recorder.

BACKGROUND OF THE INVENTION

Teletext is the generic term for the transmission of alpha-numerical information via picture lines of a television signal, which lines are not used for picture information. The quantity of information which can be displayed on the display screen of a television receiver is generally referred to as teletext page. A transmitted page comprises a coded page number and a series of displayable characters which are transmitted in the form of digital character codes. A television station transmits a plurality of teletext pages having a large variety of information such as news, weather forecasts. TV programs, sports results, exchange rates, regional information, entertainment information, etc. The user can select each page by means of its page number. To facilitate access to the searched information, the information is generally clustered in groups and some teletext pages comprise the table of contents of such a group. These pages, also called index pages, refer to the page numbers on which the searched information can be found.

U.S. Pat. No. 4,992,871 describes a television receiver which is provided with positioning means for indicating a teletext page number displayed on the display screen. The relevant page number is read and applied to the teletext decoder in order that this decoder acquires the corresponding teletext page. In this way the user is offered an attractive alternative to the operation of manually entering the individual digits of the page number.

When the user selects a page number, the teletext decoder searches the pages corresponding to this number in an autonomic manner. Such a teletext decoder is described, *inter alia* in the book "Teletext and Viewdata" by Steve A. Money, Butterworth & Co, 1979. As has been described in this book, the decoder comprises an acquisition circuit which continuously compares the selected page number with the transmitted page numbers. To this end the page numbers are coded in a specific way and accommodated in a prescribed time lock of predetermined picture lines of the television signal. If the transmitted page number corresponds to the selected page number, a memory is addressed in response to which the full page is stored in this memory for immediate or later display.

Generally, a user selects teletext pages intentionally. He calls the pages which are interesting to him and of which he knows in advance that they are available, either because they are always transmitted, or because he has been informed about their presence by means of an index page. Nevertheless, the user often remains ignorant of the presence of teletext pages with information which may be interesting to him. He is actually dependent on the tact whether the relevant page numbers have been stated. He will never see such pages, unless arbitrary browsing accidentally informs him of their presence.

OBJECT AND SUMMARY OF THE INVENTION

It is an object of the invention to provide a teletext decoder which meets said drawbacks and enhances the convenience of consulting teletext information.

To this end the teletext decoder comprises input and storage means for entering and storing a keyword, and comparison means for checking whether said keyword occurs in a received page. In that case the decoder generates an identification signal. It is thereby achieved that the teletext decoder autonomically identifies all pages in which a keyword given by the user occurs. For example, if the user is interested in the Philips exchange rates and if he does not know the number of the page(s) stating the exchange rates, he only needs to enter the keyword "Philips". The decoder then does not only find the Philips exchange rate page but, for example also a further page explaining the reason behind a considerably changed Philips exchange rate. Normally, the user would not have found this further page, e.g. because said page had been accommodated in the news column whose index page he has not consulted.

The keyword is preferably entered in a predetermined character format (capitals or lower-case letters) and all received characters are converted into this letter format. The user then does not need to worry about possible combinations of capitals and lower-case letters.

In practice, the transmitted teletext characters comprise a parity bit so as to be able to detect transmission errors which may have occurred. An embodiment of the teletext decoder according to the invention is characterized in that an error detector adds a reliability signal to each character so as to indicate whether said character participates in the comparison operation. This provides the possibility of recognizing a page with the searched keyword also when a character of the searched keyword has been mutilated by transmission errors.

For transmitting graphic images, teletext provides graphic control codes. The same character codes which are used for coding alpha-numerical characters are displayed as graphic symbols if they are preceded by such a control code. To prevent a series of such graphic symbols from being interpreted as a searched keyword, an embodiment of the teletext decoder is provided with means for preventing the identification signal from being generated when graphic symbols are received.

Various actions may be taken with the identification signal which is generated when a page with the searched keyword is received. Relatively simple teletext decoders can store the page numbers of the relevant pages and indicate them on the display screen of a television receiver. The user can subsequently call the pages individually, for example by entering the page number or, preferably, by indicating and activating the displayed page number. Decoders having an extensive memory can store the full pages with the searched keyword. The pages can subsequently be called directly and without any waiting time.

Various embodiments are feasible for entering the keyword, for example an alpha-numerical keyboard on the hand-held remote control unit or by means of On-Screen-Display of such a keyboard on the display screen, combined with an adequate cursor control. A particularly favourable embodiment of a television receiver with a teletext decoder is obtained if the receiver includes means for indicating the keyword on the display screen and for applying it to the teletext decoder. An alpha-numerical keyboard is not necessary for entering the keyword. Hence, the cost price of the remote control unit is not increased and the user need not have any typing skills to enter the keyword. The user is thereby given an extremely user-friendly facility of indicating an item on a teletext page when such a page is being consulted and of having the teletext decoder check whether there are more pages in the teletext broadcast relating to this item.

Generally a cursor corresponds to one character position on the display screen. A string of a plurality of characters can be selected by successively marking the left and right characters of this string. This operation is somewhat cumbersome for the user. In an embodiment of the television receiver the control circuit is therefore adapted to form the character string of a character selected by means of the cursor and of the adjoining characters in so far as these characters are enclosed by characters displayed as spacings. Individual words can then be selected in a single operation.

A plurality of transmitted teletext pages will often comprise the entered keyword. A multipage teletext decoder can store all these keywords for later display. A single-page teletext decoder can display, for example the page found first. In a favourable embodiment of the receiver the control circuit is adapted to display an indication for each teletext page in which the keyword occurs. These indications may be displayed on an extra row, for example in the form of the page number. In this way the user will have a survey of the pages with the keyword, also when a simple single-page teletext decoder is use. A page is actually searched and displayed if the corresponding indication is selected by means of the cursor.

To be able to use a keyword, once selected, also at a later stage, it is sensible to store it, if desired, in a memory. Such a memory is preferably of a non-volatile type. The user can thus compose a personal index of subjects in which he is interested and from which he can select a topical keyword at all times. It is very sensible to acquire the corresponding teletext pages (or at least their numbers) in advance for later, direct selection.

BRIEF DESCRIPTION OF THE FIGURES

FIGS. 7A to 7E show some examples of a part of a teletext page to illustrate the control program shown in FIG. 6.

DESCRIPTION OF EMBODIMENTS

Figure 1:
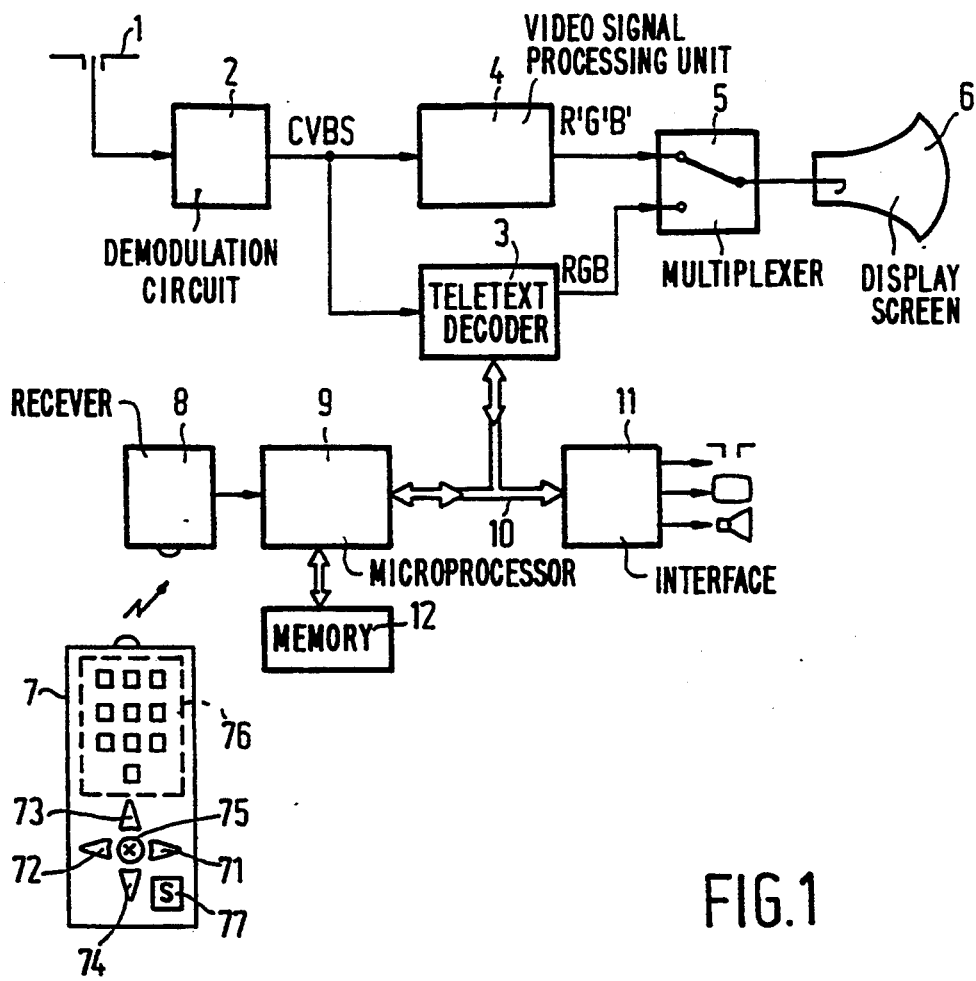
FIG. 1 shows the general structure of a television receiver with a teletext decoder according to the invention.

FIG. 1 shows the general structure of a television receiver with a teletext decoder according to the invention. The transmitter signals received at an antenna 1 are applied to a conventional tuning and demodulation circuit 2. The obtained composite video signal CVBS of the selected television program is applied to a teletext decoder 3 and to a video signal processing circuit 4. In a normal television operating state of the receiver, colour signals R'G'B' are applied from video signal processing circuit 4 via a multiplexer 5 to a display screen 6 to enable the user to watch the received television program. In a teletext operating state, which can be called by the user, colour signals RGB of the teletext decoder 3 are displayed on the display screen. The television receiver further comprises an audio reception and reproducing section (not shown).

Operating instructions given by the user are generated in a (remote control) operation unit 7 and applied to a microprocessor 9 via a receiver circuit 8. Teletext decoder 3 is connected to this microprocessor by means of a bidirectional command bus 10. An interface 11 is further connected to this command bus, which interface enables microprocessor 9 to tune the receiver to stations and to control picture brightness and sound volume and the like. This is shown by means of the appropriate symbols in the Figure. The microprocessor is also connected to a non-volatile memory 12.

Figure 2A:
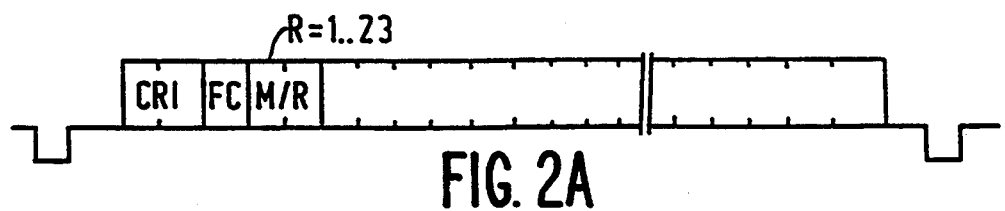
FIGS. 2A and 2B show some examples of teletext data packets constituting a transmitted teletext page.
Figure 2B:
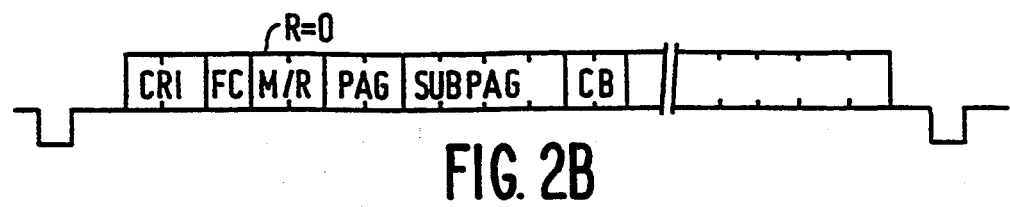

The composite video signal CVBS comprises one or more picture lines with teletext information in the field flyback period. In "World System Teletext", a widely used teletext system which will be taken as an example, such a picture line comprises a data packet of 45 bytes. FIG. 2 shows two possible formats of such a data packet in greater detail. The first 2 bytes of a data packet have a fixed bit pattern 1010 . . . 10 and are referred to as "clock run-in". They are denoted by CRI in the Figure. The third byte is a "framing code" FC and also has a fixed value. The next 2 bytes comprise a 3-bit magazine number M and a 5-bit row number R. They are protected against the occurrence of transmission errors by means of additional protection bits. The significance of the other 40 bytes depends on the value of the row number R. If the row number has one of the values 1–23, as is shown in FIG. 2A, each one of the 40 bytes comprises a 7-bit character code (or a special control code) as well as a parity bit. Each character code represents a displayable character. The 40 characters jointly constitute a row of text of a teletext page and will hereinafter be referred to as "text row". FIG. 2B shows the data packet if the row number R=0. In the first eight bytes of such a data packet, hereinafter referred to as "page header", two page number bytes PAG, four sub-page number bytes SUBPAG arid a plurality of control bits CB are coded. The remaining 32 bytes of the page header are character codes and represent characters for display on the display screen. The page header and 23 text rows jointly constitute the teletext page. The transmission of such a page starts with, and implies, the relevant page header and subsequently comprises the relevant text rows. The page is identified by the magazine number M and the page number bytes PAG. Together, they constitute a 3-digit number which will hereinafter be referred to as page number. The page numbers 100–899 are used in practice. For particular applications the sub-page number SUBPAG may also be included in the identification of the page.

Figure 3:
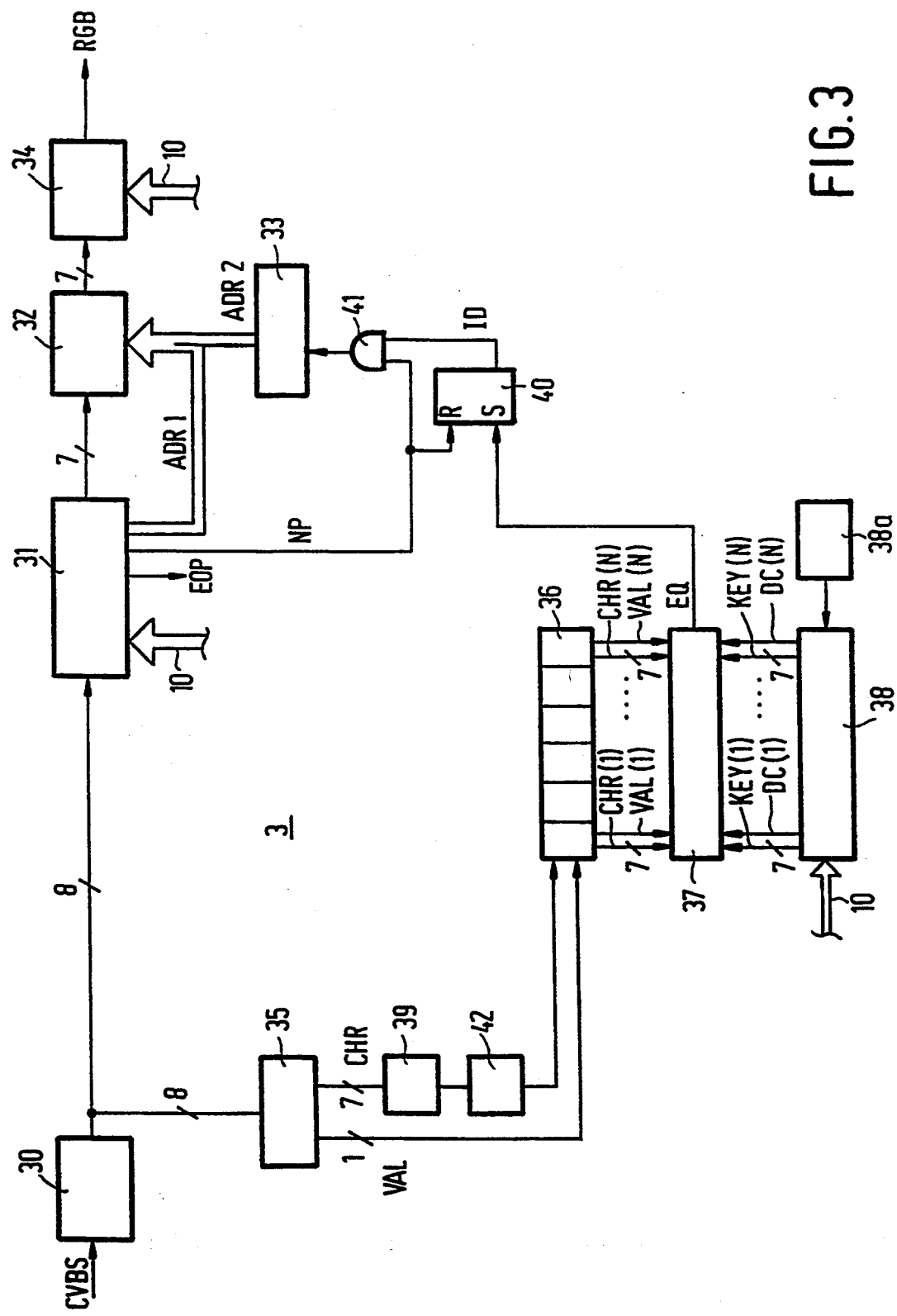
FIG. 3 shows diagrammatically the functional structure of the teletext decoder of FIG. 1.

FIG. 3 shows diagrammatically the functional structure of the teletext decoder 3. The received composite video signal CVBS is applied to a data regenerator 30. This regenerator comprises a data slicer and a series-parallel converter which applies the received data packets in 8-bit parallel form to a page acquisition circuit 31.

The page acquisition circuit stores the teletext page received at that moment, or a predetermined part thereof, in a memory 32. This memory has such a capacity that it can store a plurality of teletext pages or their predetermined parts. A write address applied to the memory comprises a part which is generated by page acquisition circuit 31 and is denoted by ADR1 in the Figure and a part which is generated by a page counter 33 and is denoted by ADR2 in the Figure. Page counter 33 will be further described hereinafter, it suffices now to note that the address part ADR2 remains constant during the reception of a teletext page. The teletext pages stored in the memory 32 are selectively displayed by means of a character generator 34. This generator converts the character codes into the displayable colour signals RGB which are applied to the display screen 6 (see FIG. 1). Embodiments of the data regenerator 30 and the character generator 34 are extensively described in the book "Teletext and Viewdata" referred to in the opening paragraph. A page acquisition circuit is also described in this book (chapter 4). However, the page acquisition circuit 31 shown in FIG. 3 is also adapted to acquire and store teletext pages regardless page numbers. To this end the microprocessor may apply, as it were, a "don't care" page number to the page acquisition circuit via the command bus 10. The page acquisition circuit 31 is further adapted to generate a pulse NP upon detection of a new page.

The data packets from the data regenerator 30 are also applied to a parity detector 35. This detector generates for each received byte a 7-bit character code CHR and a validity bit VAL which indicates by means of the value "1" that the character code may be regarded as faultless. In a subsequent lower-case-to-upper-case converter 39 lower-case letters are converted into capital letters. The parity detector and the lower-case-to-upper-case converter are known per se and do not require any further explanation. Subsequently, graphic symbols are detected in a graphic symbol detector 42. As will be described, graphic symbols undergo a special treatment in this detector. The graphic symbol detector 42 may as yet be left out of consideration. The 7-bit character codes CHR with their corresponding validity bit VAL are applied to an 8-bit wide, N characters long shift register 36. Consequently, the most recently received series of N character codes CHR(1) ... CHR(N) from the teletext page is always simultaneously available at the output of the register. The corresponding validity bits VAL(1) ... VAL(N) are also parallel available. They are both applied to first inputs of a comparator 37.

An externally supplied character string is stored in a further register 38 via the command bus 10. This character string is entered by the user and will hereinafter be referred to as "keyword". The keyword comprises N letters denoted by KEY (1) ... KEY (N). A "do care" bit is associated with each of the entered letters in such a way that only those letters which actually constitute the keyword are provided with a "do care" bit of the value "1" The "do care" bits are denoted by DC(1) ... DC(N). The keyword and the "do care" bits are applied to second inputs of the comparator 37.

Figure 4:
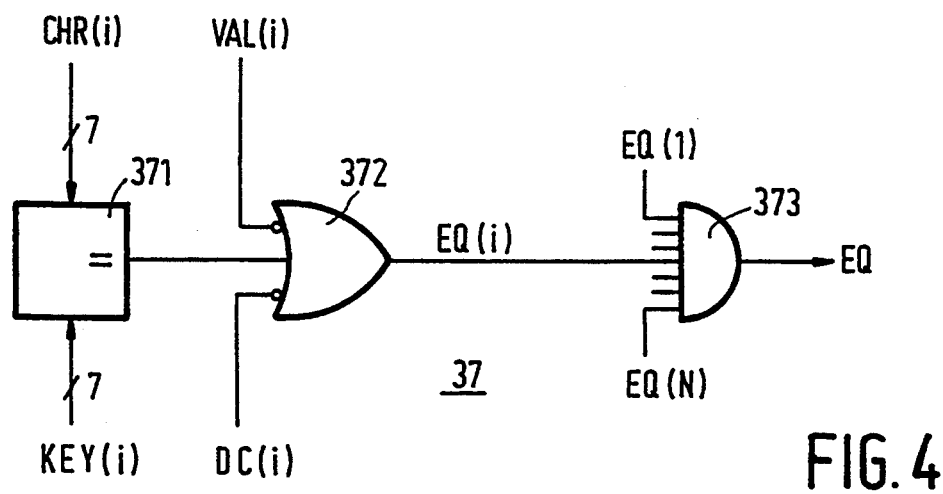
FIGS. 4 and 5 show possible embodiments of some circuits of FIG. 3.

The comparator 37 compares the N received character codes with the entered keyword and supplies an equality signal EQ if the keyword occurs therein. As is shown in greater detail in FIG. 4, each character code CHR(i) is individually compared in a sub-comparator 371 with a corresponding letter KEY(i) of the keyword.

The output signal of the sub-comparator 371 is applied to an input of a gate circuit 372 which further receives the validity bit VAL(i) and the "do care" bit DC(i). The output of gate circuit 372 supplies a signal EQ(i) of the value "1" if both characters correspond or if the "do care" bit has the value "0". In the latter case the letter KEY(i) does not form part of the keyword. The gate circuit also supplies the value "1" when the validity bit has the value "0". In this way it is avoided that a page is not identified only because of the bit error in one of its characters. The signals EQ(i), i=1 ... N, of each sub-comparator are collected at an AND gate 373 which supplies the equality signal EQ if the keyword in the character string is recognized.

The equality signal EQ only occurs for a short time. Referring again to FIG. 3, it appears to be applied to the set input of an identification flipflop 40 of the SR type. The flipflop is set thereby and retains this state until it is reset by a "new page" pulse NP. The output signal of the identification flipflop thus constitutes an identification signal ID indicating whether the searched keyword has occurred during reception of the teletext page. The pulse NP and the identification signal ID are applied to an AND gate 41. If the keyword has occurred, the identification signal ID opens the gate 41 in order to enable the pulse NP to clock a page counter 33.

If the searched keyword does not occur in a teletext page during reception of this page, the page counter 33 does not receive a clock pulse. The address part ADR2 which is applied by the counter to the memory 32 then does not change. Consequently, the next page will be written in the same part of the memory and the old page will be overwritten. However, if the keyword has been recognized once or several times in the received teletext page, the counter 33 is clocked at the start of a new page so that the address part ADR2 is raised by 1. The new page is now written into another part of the memory 32 and the page just received is saved in the memory. This applies to each subsequent teletext page in which the searched keyword occurs. The character generator 34 may be instructed via the command bus 10 in further known manner to read and display a selected part from the memory.

In a simplified embodiment of the teletext decoder the full teletext pages are not written into memory 32, but only a predetermined part thereof. This may be, for example the page header or only the page number coded therein. Even with a modest capacity of the memory 32 it is then possible to store at least the page numbers of those pages comprising the searched keyword. If desired, the relevant part of the memory 32 with the stored page numbers can be presented in the form of a survey to the user by the character generator 34. At a later stage the pages can still be requested in known manner on the basis of their page numbers. Of course, the waiting time which is known for teletext occurs for each page in this case.

As is known, the transmitted data packets in "World System Teletext" may comprise control codes instead of character codes. Particularly, "World System Teletext" defines control codes for switching from an alphanumerical to a graphic display mode, and conversely. The same character codes which represent alphanumerical symbols represent a graphic symbol if they are preceded by a graphic control code. The previously mentioned graphic symbol detector 42 (see FIG. 3) prevents such graphic symbols from being interpreted as letters of a keyword.

Figure 5:
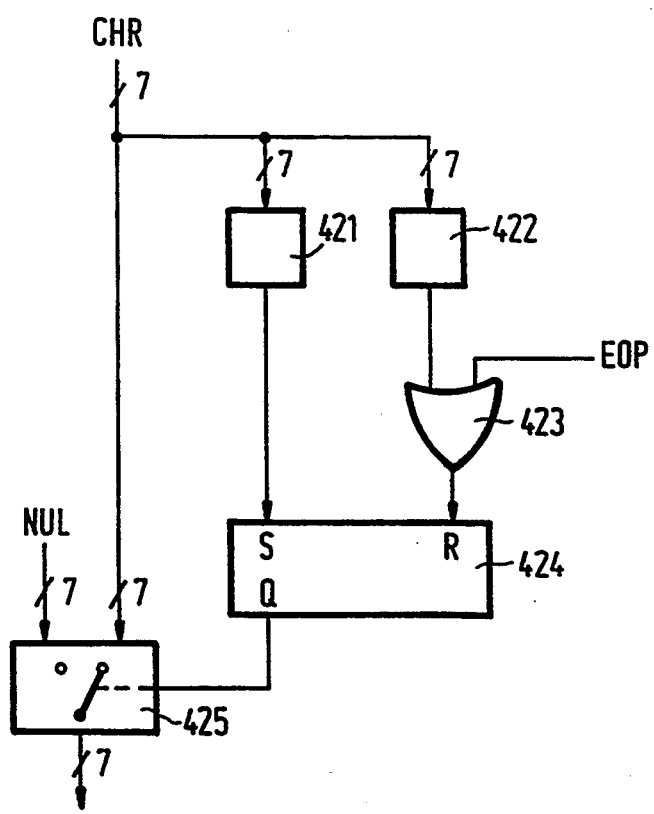

A possible embodiment of such a graphic symbol detector is shown in FIG. 5. The occurrence of a graphic control code for switching to the graphic display mode is detected by a gate circuit 421. The occurrence of an alpha-numerical control code for switching back to the alpha-numerical display code is detected by a gate circuit 422. An SR flipflop 424 is set by the graphic control code. The flipflop is reset by the alpha-numerical control code or by a signal EOP which indicates the end of a data packet. The signal EOP is generated by the page acquisition circuit 31 (see FIG. 3) and applied to the reset input of the flipflop via an OR gate 423. The output signal of the flipflop 424 now indicates for each character CHR whether it represents a graphic or an alpha-numerical symbol. The output signal of the flipflop controls a multiplexer 425 which, in response thereto, passes alpha-numerical symbols unchanged but replaces graphic symbols by a predetermined character code NUL. The character code NUL represents a non-alpha-numerical symbol. Now, a received series of characters including one or more graphic symbols can never correspond to a keyword.

It is further to be noted that the keyword register 38 (see FIG. 3) may be adapted to store a plurality of keywords. These words are applied successively to the comparator 37 by means of a counter 38a. In this manner teletext pages satisfying "OR" combinations or "AND" combinations of keywords can be identified. Since teletext pages are transmitted cyclically, the successive comparisons may be performed in such a way that pages with a first keyword are searched in one cycle and pages with a second keyword are searched in another cycle.

The television receiver shown in FIG. 1 further comprises means for positioning a cursor on the display screen. There are many embodiments of these means. The hand-held remote control unit 7 is provided, by way of example, with arrow keys →71, ←72, ↑73 and ⊖74 for controlling a cursor and an activation key X 75 for activating the cursor position. The remote control unit also has a decimal keyboard 76 and a storage key S 77.

Figure 6:
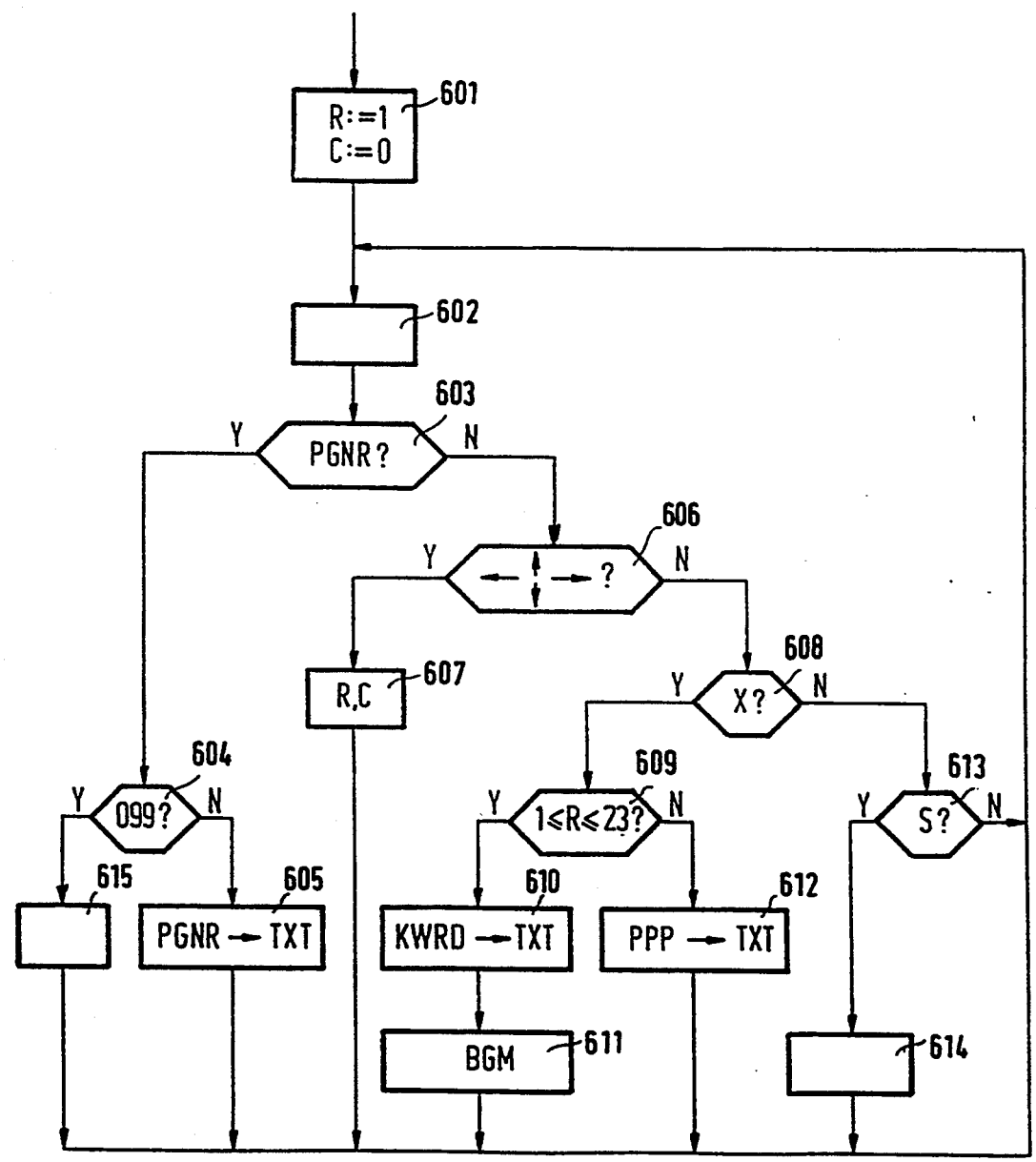
FIG. 6 shows the flow chart of a control program performed by a control circuit shown in FIG. 1.

The operation of the television receiver is determined by a control program which is stored in the microprocessor 9. FIG. 6 shows the flow chart of a possible example of this control program. The program is performed as soon as the television receiver assumes the teletext operating state. In a step 601 cursor coordinates R,C acquire an initial value. Here R is the row number and C is the column number of a teletext page, assuming that the teletext page comprises 25 rows ($0 \leq R \leq 24$) of 40 characters ($0 \leq C \leq 39$). R=0 represents a page header with the name of the station, time, etc., which data are not relevant for the selection of keywords. The first character position of the teletext page is thus selected by means of the initial values R=1 and C=0. In a step 602 the control program subsequently determines the character string of which the character at the position R,C forms part and which is enclosed at both sides by a spacing or by the end of a row. The character string is marked on the display screen so that it is clearly recognizable to the user. In a pseudo-programming language notation, step 602 is written, for example, as follows:

$C_L := C$;

do $C_L := C_L - 1$ until CHR(R,$C_L$)='''' or $C_L = 0$;

$C_R := C$;

do $C_R := C_R + 1$ until CHR(R,$C_R$)='''' or $C_R = 39$;

in this way $C_L$ and $C_R$ will have the column number of the left and right spacings. The reference CHR(i,j) is understood to mean the character which is displayed at the character position (i,j).

In a step 603 it is subsequently checked whether a page number PGNR has been entered on the decimal keyboard (76, see FIG. 1). In a step 604 it is also checked whether the entered page number is 099. This page number is outside the range between 100 and 899 which is generally used for teletext. As will be further described, it is used for special purposes in this embodiment. The usual page numbers in the range between 100 and 899 are applied to the teletext decoder in a step 605, whereupon this decoder acquires the relevant page in the usual way and displays this page. The control program subsequently returns to the step 602 and now marks a character string on the teletext page which has just been acquired.

In a step 606 of the control program it is checked whether one of the arrow keys → ← ↑ ⊖ (71-74, see FIG. 1) has been depressed. If this is the case, new cursor coordinates R,C are computed in a step 607. In a pseudo-programming language notation, this step 607 is written as follows:

if ↑ then R:=R−1;

if ⊖ then R:=R+1;

if ← then C:=$C_L$−1;

if → then C:=$C_r$+1;

The row number R is increased or decreased by 1 by means of the arrow keys ↑ and ⊖, respectively. The column number assumes a new value to the left of the left-hand spacing and to the right of the right-hand spacing by means of the arrow keys ← and →, respectively.

Figures 7A, 7B, 7C, 7D, 7E:
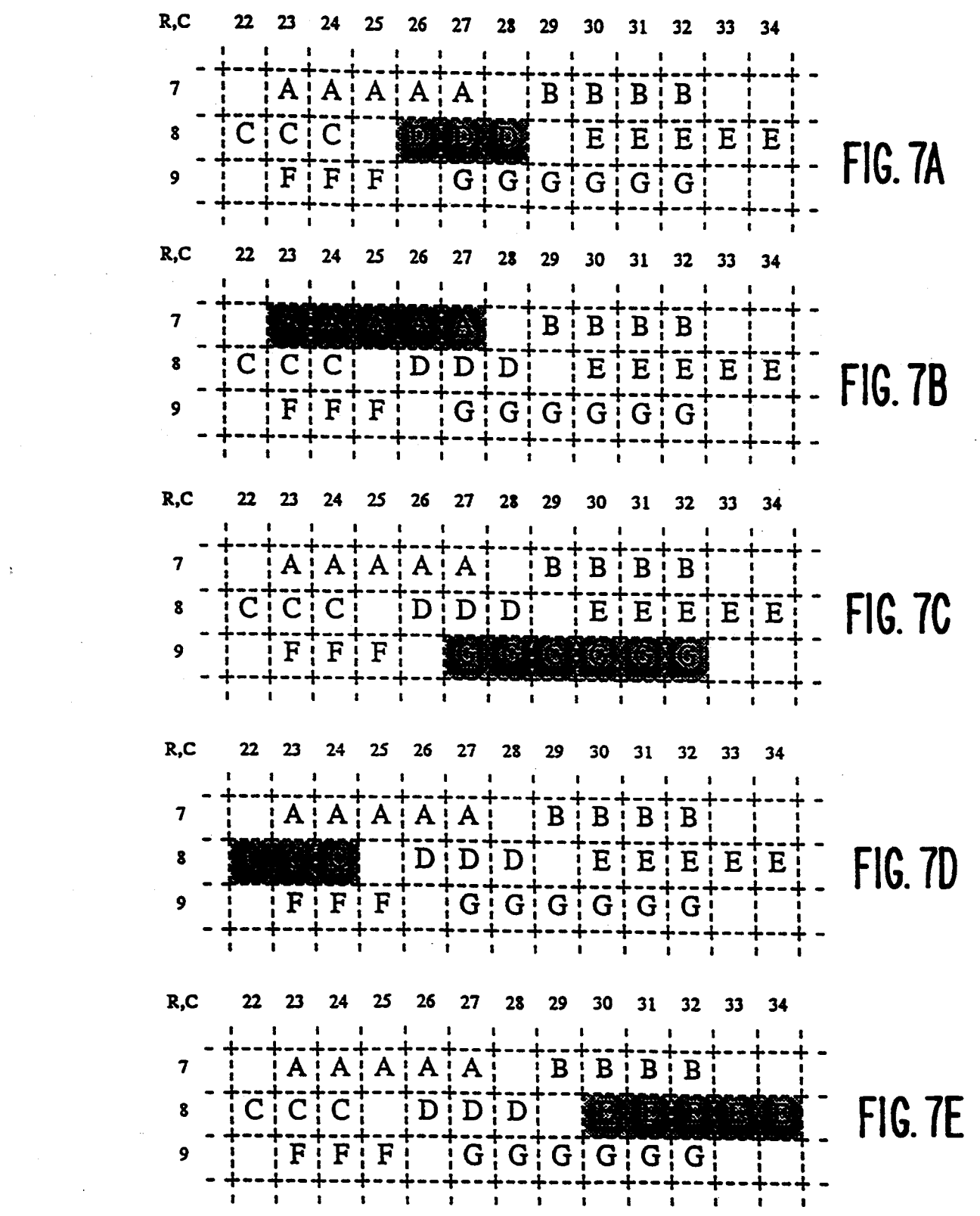

After the step 607 has been performed, the control program returns to the step 602 in order to mark the word displayed at the new character position. For the purpose of illustration FIG. 7 shows a part of a teletext page. In FIG. 7A the character position has the value 8,27. This is indicated in the Figure by underlining the relevant character at this position. The corresponding character string is shaded in the Figure. Starting from FIG. 7A, FIGS. 7B to 7E show the effects of using the different arrow keys. In FIG. 7B the new character position is 7,27 as a result of using key ↑. In FIG. 7C the new position is 9,27 as a result of using the key ⊖. In FIG. 7D the new position is 8,24 as a result of using the key ←. In FIG. 7E the new position is 8,30 as a result of using the key →.

In a step 608 of the control program shown in FIG. 6 it is checked whether the activation key X (75, see FIG. 1) has been depressed. In a step 609 it is checked whether this key is depressed while the cursor is present in one of the rows 1-23 or in row 24. The rows 1-23 correspond to the teletext page transmitted by the station, while row 24 is a text row locally written by the microprocessor. It will initially be assumed that the activation key X is depressed for the case where $1 \leq R \leq 23$. In a step 610 the marked character string is then applied to the teletext decoder. This activated character string represents a keyword KWRD entered by the user. Whenever a page is received, the teletext decoder is adapted to fix the number of this page by means of this keyword. These page numbers are further processed by the control program in a background program BGM which is started in a step 611 for this purpose. The control program returns to the step 602 so as to wait for further key touches.

Figure 8:
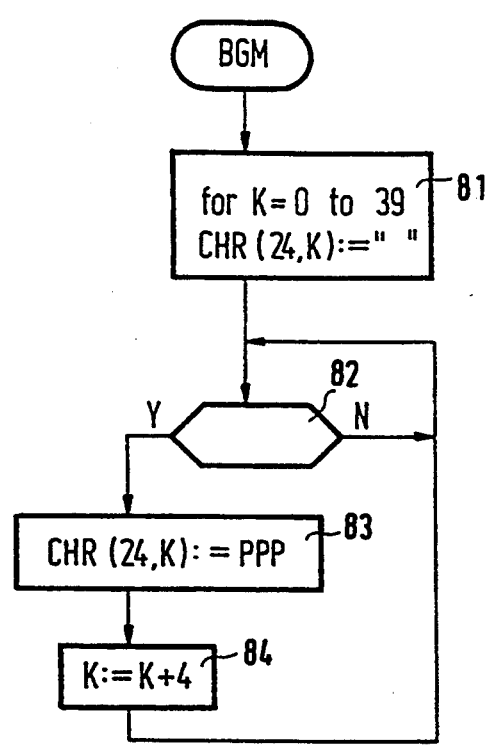
FIG. 8 shows the flow chart of a background program performed by the control circuit shown in FIG. 1.

Before continuing the description of the control program, it will be sensible to elucidate the background program BGM. A flow chart of this program is shown in FIG. 8. In a step 81 the background program erases all 40 characters in row 24 on the display screen. In a step 82 the background program subsequently waits for the reception of a teletext page by the teletext decoder, which page includes the entered keyword KWRD. In a step 83 the page number PPP of such a page is fixed and displayed at character position (24,K) etc. on the display screen. Subsequently, K is raised by 4 in a step 84 and the program returns to the step 82 so as to wait for the reception of a subsequent page. Row 24 of the display screen thus supplies the user with a survey of all teletext pages in which the entered keyword KWRD occurs. In the example described the identification takes the form of the relevant 3-digit page number PPP. However, it may alternatively be a simple symbol. In that case the corresponding page number is stored elsewhere. Further refinements are alternatively possible such as, for example, a test on double page numbers.

Reverting to the control program shown in FIG. 6, it will now be assumed that it is determined in step 609 that the activation key X is depressed while an identification in row 24 is selected. As is apparent from the foregoing, a page number PPP is associated with the identification. In a step 612 this page number is applied to the teletext decoder so that it acquires and displays the requested page in known manner. If the teletext decoder is a multipage decoder, it can even display the page immediately without any waiting time. The control program returns to the step 602 so as to wait for the next key touch.

In a step 613 of the control program it is finally checked whether the storage key S (77, see FIG. 1) has been depressed. If this is the case, a step 614 is performed in which the instantaneously selected keyword is stored in the non-volatile memory 12 (see FIG. 1). In this way a personal index of keywords is built up in said memory. This enables the user to select a previously programmed keyword in a subsequent teletext session. This is effected by displaying the contents of the memory in the form of a page with an index of keywords. The relevant display signal is formed in this example by the page number 099 which is not in use for transmitted teletext pages. Entering the page number 099 is detected in the step 604, whereafter the control program displays the index of keywords on the display screen in a step 615. A keyword is selected from this index in the manner already described.

We claim:

1. A teletext decoder for receiving teletext pages, each of said teletext pages including a page number and a series of characters, said decoder comprising:
   means for receiving one of said teletext pages;
   storage means for storing a character string; and
   comparison means for comparing said character string and said series of characters of said one teletext page to determine whether said character string occurs in said series of characters.

2. The decoder as claimed in claim 1, further including converting means coupled to said comparison means for converting character representative of letters into corresponding capital letters or lower-case letters.

3. The decoder as claimed in claim 1, wherein at least one of said characters in said series of characters include with one or more validity bits and wherein said decoder includes an error detector for receiving said validity bit and for determining whether the comparison of said character with said character string should be validated.

4. The decoder as claimed in claim 1, further including a graphic detector for determining whether said one character includes graphics and preventing said graphic character from being compared to said character string.

5. The decoder as claimed in claim 1, wherein said storage means stores a further character string and further including counting means coupled to said storage means for successively applying said character string and said further character string to said comparison means.

6. A television signal receiver for displaying a teletext page, said teletext page including a series of characters, said receiver including a teletext decoder for receiving a video information signal and comprising:
   means for receiving said teletext page;
   storage means for storing a character string; and
   comparison means for comparing said character string and said series of characters of said teletext page to determine whether said character string occurs in said series of characters;
   display means responsive to said comparison means for displaying said teletext page if said character string occurs in said series of characters.

7. The receiver as claimed in claim 6, further including
   operating means for selecting a character string displayed on said display means; and
   control means for reading said character string selected by said operating means and for applying said character string to said teletext decoder for acquiring said teletext page including said character string.

8. The receiver as claimed in claim 7, wherein said operating means includes a cursor, whereby said cursor is positioned at one character in said series of characters to select said character string which includes said one character and all characters adjoining said one character enclosed by spacing characters.

9. A receiver as claimed in claim 7, wherein said control means displays an indication for said teletext pages which include said character string and acquires said corresponding page upon selection of said displayed indication.

10. The receiver as claimed in claim 7, further including a memory coupled to said control means and wherein said control circuit stores said character string in said memory in response to a storage signal received from said operating means.

11. The receiver as claimed in claim 10, wherein said control means receives said character string from said memory and in response to a display signal from said operating means, transmits said character string to said display means.

12. The receiver as claimed in claim 11, wherein said teletext page has a page number and wherein said display signal includes a predetermined page number which does not correspond to said teletext page.

13. The decoder of claim 7, wherein said series of characters includes at least one of alphanumeric, graphic and spacing characters.

14. The decoder as claimed in claim 1, further including means for generating an identification signal if said character string occurs in said series of characters of said one teletext page.

15. The decoder as claimed in claim 14, further including means for storing at least a portion of said teletext page if said character string occurs in said series of characters of said one teletext page.

16. The decoder as claimed in claim 15, further including addressing means for directing said memory to store any further teletext pages in a further memory in response to an identification signal.

17. The decoder as claimed in claim 15, wherein each teletext page includes a page number and wherein said portion of said one page comprises at least its page number.

18. The decoder as claimed in claim 17, further including a character generator for generating for display, said page number in response to said identification signal.

* * * * *